US012422720B2

(12) United States Patent
Wu et al.

(10) Patent No.: US 12,422,720 B2
(45) Date of Patent: Sep. 23, 2025

(54) PIXEL STRUCTURE AND DESIGN METHOD THEREOF, AND DISPLAY PANEL

(71) Applicant: TCL CHINA STAR OPTOELECTRONICS TECHNOLOGY CO., LTD., Shenzhen (CN)

(72) Inventors: Wei Wu, Shenzhen (CN); Zeke Zheng, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/432,491

(22) PCT Filed: Jun. 9, 2021

(86) PCT No.: PCT/CN2021/099045
§ 371 (c)(1),
(2) Date: Aug. 20, 2021

(87) PCT Pub. No.: WO2022/252263
PCT Pub. Date: Dec. 8, 2022

(65) Prior Publication Data
US 2025/0231451 A1    Jul. 17, 2025

(30) Foreign Application Priority Data
May 31, 2021   (CN) .......................... 202110598414.9

(51) Int. Cl.
*G02F 1/1368*    (2006.01)
*G02F 1/1343*    (2006.01)
(52) U.S. Cl.
CPC ...... *G02F 1/1368* (2013.01); *G02F 1/134309* (2013.01)

(58) Field of Classification Search
CPC .......................... G02F 1/1368; G02F 1/134309
See application file for complete search history.

(56) References Cited

U.S. PATENT DOCUMENTS

| | | |
|---|---|---|
| 2008/0079884 A1 | 4/2008 | Chiu et al. |
| 2016/0197104 A1 | 7/2016 | Kim et al. |

(Continued)

FOREIGN PATENT DOCUMENTS

| | | |
|---|---|---|
| CN | 101546077 A | 9/2009 |
| CN | 204065625 U | 12/2014 |

(Continued)

OTHER PUBLICATIONS

International Search Report in Inetrnational applicant No. PCT/CN2021/099045, mailed on Jan. 26, 2022.

(Continued)

*Primary Examiner* — Anne M Hines
(74) *Attorney, Agent, or Firm* — PV IP PC; Wei Te Chung

(57) ABSTRACT

A pixel structure and design method thereof, and a display panel are provided. The pixel structure includes a plurality of thin film transistors. Wherein, a channel width and a channel length of a second driving thin film transistor and a channel width a channel length of a voltage division thin film transistor satisfy a preset equation, and voltage division ratios of the second driving thin film transistor and the voltage division thin film transistor are allowed to be basically same as a preset voltage division ratio when the pixel structure is designed, so a problem of uneven brightness in current display panels is relieved.

20 Claims, 5 Drawing Sheets

(56) References Cited

U.S. PATENT DOCUMENTS

| | | | |
|---|---|---|---|
| 2016/0380114 A1 | 12/2016 | Kong et al. | |
| 2018/0307104 A1 | 10/2018 | Park et al. | |
| 2019/0146292 A1* | 5/2019 | Woo | G09G 3/3696 349/139 |
| 2020/0004069 A1* | 1/2020 | Kim | H10D 86/40 |
| 2021/0407447 A1* | 12/2021 | Jiang | H10D 86/60 |

FOREIGN PATENT DOCUMENTS

| | | |
|---|---|---|
| CN | 104865763 A | 8/2015 |
| CN | 106252363 A | 12/2016 |
| CN | 107991818 A | 5/2018 |
| CN | 109254460 A | 1/2019 |
| CN | 111487820 A | 8/2020 |
| CN | 211293540 U | 8/2020 |
| CN | 111948860 A | 11/2020 |
| CN | 112068376 A | 12/2020 |
| KR | 20160084553 A | 7/2016 |

OTHER PUBLICATIONS

Written Opinion of the International Search Authority in Inetrnational applicant No. PCT/CN2021/099045, mailed on Jan. 26, 2022.
Chinese Office Action in corresponding Chinese Patent Applicant No. 202110598414.9 dated Dec. 20, 2021, pp. 1-9.

* cited by examiner

PIXEL STRUCTURE AND DESIGN METHOD THEREOF, AND DISPLAY PANEL

RELATED APPLICATIONS

This application is a Notional Phase of PCT Patent Application No. PCT/CN2021/099045 having international filing date of Jun. 9, 2021, which claims the benefit of priority of Chinese Patent Application No. 202110598414.9 filed on May 31, 2021. The contents of the above applications are all incorporated by reference as if fully set forth herein in their entirety.

BACKGROUND OF INVENTION

Field of Invention

The present application relates to the field of display technology, and particularly to a pixel structure and a design method thereof, and a display panel.

Description of Prior Art

In liquid crystal display (LCD) industry, pixel structures of multi-domain vertical alignment (MVA) products are usually divided into two pixel regions, which are respectively a main pixel region and a sub-pixel region. The two pixel regions are driven by three thin film transistors (TFTs). The three thin film transistors are a main TFT, a sub TFT and a share TFT Wherein, the sub TFT is coupled in series with the share TFT to divide a voltage, so that when the voltage is inputted into same data lines, a driving voltage of the sub-pixel region is different from a driving voltage of the main pixel region, thereby achieving an effect of increasing a viewing angle.

However, in array processes, as different regions of a display substrate are affected by processes of ultraviolet exposure, development, wet etching, etc., or equipment, aspect ratios of the share TFT and the sub TFT in the pixel structure are changed. Therefore, division voltages of the share TFT and the sub TFT are changed. This results in the driving voltage of the sub-pixel region being changed, thereby changing brightness of the sub-pixel region and causing uneven brightness of the entire display panel.

Therefore, a technical problem of uneven brightness existing in current display panels needs to be solved.

SUMMARY OF INVENTION

The present application provides a pixel structure and a design method thereof, and a display panel to relieve the technical problem of uneven brightness existing in the current display panels.

In order to solve the problems mentioned above, the present disclosure provides following technical solutions.

One embodiment of the present application provides a pixel structure, including a plurality of sub-pixel units. Each of the sub-pixel units includes a first pixel electrode and a second pixel electrode, and a plurality of thin film transistors. The plurality of thin film transistors include:
  a first driving thin film transistor connected to the first pixel electrode;
  a second driving thin film transistor connected to the second pixel electrode; and
  a voltage division thin film transistor connected to the second driving thin film transistor.

Wherein a channel width a and a channel length b of the second driving thin film transistor and a channel width c and a channel length d of the voltage division thin film transistor satisfy an equation:

$$\frac{\left(\frac{f}{c}+\frac{n}{d}\right)-\left(\frac{e}{a}+\frac{1}{b}\right)}{\left(\frac{e}{a}+\frac{1}{b}\right)} < 10\%.$$

Wherein, n represents a number of channels of the voltage division thin film transistor, e and f respectively represent a variation parameter of the channel widths of the second driving thin film transistor and the voltage division thin film transistor, when the channel widths are changed, the variation parameter is 1, and when the channel widths are not changed, the variation parameter is 0.

In the pixel structure provided by one embodiment of the present application, each of the thin film transistor includes a source electrode, a drain electrode, and a semiconductor layer, the source electrode and the drain electrode are spaced apart on the semiconductor layer, and a channel of the thin film transistors is formed in a region between the source electrode and the drain electrode, and wherein the source electrode, the drain electrode, and the semiconductor layer are formed by a same photomask, and the channel widths are changed.

In the pixel structure provided by one embodiment of the present application, the channel of the second driving thin film transistor and the channel of the voltage division thin film transistor are disposed to be U-shaped or I-shaped, and the number of the channel of the voltage division thin film transistor is 1.

In the pixel structure provided by one embodiment of the present application, the channel of the second driving thin film transistor is disposed to be U-shaped or I-shaped, the channels of the voltage division thin film transistor include a first sub-channel and a second sub-channel, the first sub-channel is disposed to be I-shaped, the second sub-channel is disposed to be I-shaped, the second sub-channel and the first sub-channel are disposed in parallel and spaced apart from each other, and the number of the channels of the voltage division thin film transistor is 2.

In the pixel structure provided by one embodiment of the present application, each of the thin film transistor includes a source electrode, a drain electrode, and a semiconductor layer, the source electrode and the drain electrode are spaced apart on the semiconductor layer, and a channel of the thin film transistors is formed in a region between the source electrode and the drain electrode, and wherein the source electrode, the drain electrode, and the semiconductor layer are formed by different photomasks.

In the pixel structure provided by one embodiment of the present application, the channel of the second driving thin film transistor is disposed to be U-shaped, the channels of the voltage division thin film transistor is disposed to be I-shaped, the channel width of the second driving thin film transistor is changed, the channel width of the voltage division thin film transistor is not changed, and the number of the channel of the voltage division thin film transistor is 1.

In the pixel structure provided by one embodiment of the present application, the channel of the second driving thin film transistor is disposed to be U-shaped, the channels of the voltage division thin film transistor include a first sub-channel and a second sub-channel disposed in parallel and spaced apart, the first sub-channel and the second sub-channel are disposed to be I-shaped, the channel width of the second driving thin film transistor is changed, the channel width of the voltage division thin film transistor is not changed, and the number of the channels of the voltage division thin film transistor is 2.

In the pixel structure provided by one embodiment of the present application, the channel of the second driving thin film transistor is disposed to be I-shaped, the channels of the voltage division thin film transistor include a first sub-channel and a second sub-channel disposed in parallel and spaced apart, the first sub-channel and the second sub-channel are disposed to be I-shaped, the channel widths of the second driving thin film transistor and the voltage division thin film transistor are not changed, and the number of the channels of the voltage division thin film transistor is 2.

In the pixel structure provided by one embodiment of the present application, wherein the channel width a and the channel length b of the second driving thin film transistor and the channel width c and the channel length d of the voltage division thin film transistor satisfy an equation:

$$\frac{f}{c} + \frac{n}{d} = \frac{e}{a} + \frac{1}{b}.$$

One embodiment of the present application further provides a display panel, including a first substrate and a second substrate disposed opposite to each other, and a plurality of liquid crystal molecules disposed between the first substrate and the second substrate, and wherein the first substrate includes the pixel structure in one of the aforesaid embodiments.

One embodiment of the present application further provides a design method of the pixel structure. The pixel structure includes a plurality of sub-pixel units. Each of the sub-pixel units includes a first pixel electrode and a second pixel electrode. A plurality of thin film transistors are disposed between the first pixel electrode and the second pixel electrode. The plurality of thin film transistors include:
a first driving thin film transistor connected to the first pixel electrode;
a second driving thin film transistor connected to the second pixel electrode; and
a voltage division thin film transistor connected to the second driving thin film transistor.
the design method of the pixel structure includes:
determining channel lengths and channel widths of the second driving thin film transistor and the voltage division thin film transistor according to preset channel lengths and preset channel widths of the second driving thin film transistor and the voltage division thin film transistor and variation of source electrodes and drain electrodes of the thin film transistors, wherein the channel lengths and the channel widths of the second driving thin film transistor and the voltage division thin film transistor satisfy an equation:

$$\frac{\left(\frac{f}{c} + \frac{n}{d}\right) - \left(\frac{e}{a} + \frac{1}{b}\right)}{\left(\frac{e}{a} + \frac{1}{b}\right)} < 10\%,$$

and wherein a and b respectively represent the channel width and the channel length of the second driving thin film transistor, c and d respectively represent the channel width and the channel length of the voltage division thin film transistor, n represents a number of channels of the voltage division thin film transistor, e and f respectively represent a variation parameter of the channel widths of the second driving thin film transistor and the voltage division thin film transistor, when the channel widths are changed, the variation parameter is 1, and when the channel widths are not changed, the variation parameter is 0.

In the design method of the pixel structure provided by one embodiment of the present application, determining the channel lengths and the channel widths of the second driving thin film transistor and the voltage division thin film transistor according to the preset channel lengths and the preset channel widths of the second driving thin film transistor and the voltage division thin film transistor and the variation of the source electrodes and the drain electrodes of the thin film transistors includes:
obtaining the preset channel lengths and the preset channel widths of the second driving thin film transistor and the voltage division thin film transistor; and
determining the variation of the source electrodes and the drain electrodes of the thin film transistors.

In the design method of the pixel structure provided by one embodiment of the present application, wherein the channel width a and the channel length b of the second driving thin film transistor and the channel width c and the channel length d of the voltage division thin film transistor satisfy an equation:

$$\frac{f}{c} + \frac{n}{d} = \frac{e}{a} + \frac{1}{b}.$$

In the pixel structure and the design method thereof, and the display panel, the channel width a and the channel length b of the second driving thin film transistor and the channel width c and the channel length d of the voltage division thin film transistor satisfy an equation:

$$\frac{\left(\frac{f}{c} + \frac{n}{d}\right) - \left(\frac{e}{a} + \frac{1}{b}\right)}{\left(\frac{e}{a} + \frac{1}{b}\right)} < 10\%.$$

The voltage dividing ratios of the second driving thin film transistor and the voltage division thin film transistor satisfying the equation are basically same as the preset voltage division ratio when the pixel structure is designed. Therefore, the second driving thin film transistor and the voltage division thin film transistor are not affected by factors of processes of ultraviolet exposure, development, wet etching, etc., or equipment. The problems that the aspect ratios of the share TFT and the sub TFT in the pixel structure are changed, resulting in division voltages of the share TFT and the sub TFT being changed, and causing uneven brightness of the entire display panel in the current pixel structures is solved.

DESCRIPTION OF DRAWINGS

In order to more clearly illustrate embodiments or the technical solutions of the present disclosure, the accompanying figures of the present disclosure required for illustrating embodiments or the technical solutions of the present disclosure will be described in brief. Obviously, the accompanying figures described below are only part of the embodiments of the present disclosure, from which those skilled in the art can derive further figures without making any inventive efforts.

DETAILED DESCRIPTION OF PREFERRED EMBODIMENTS

Figure 1:
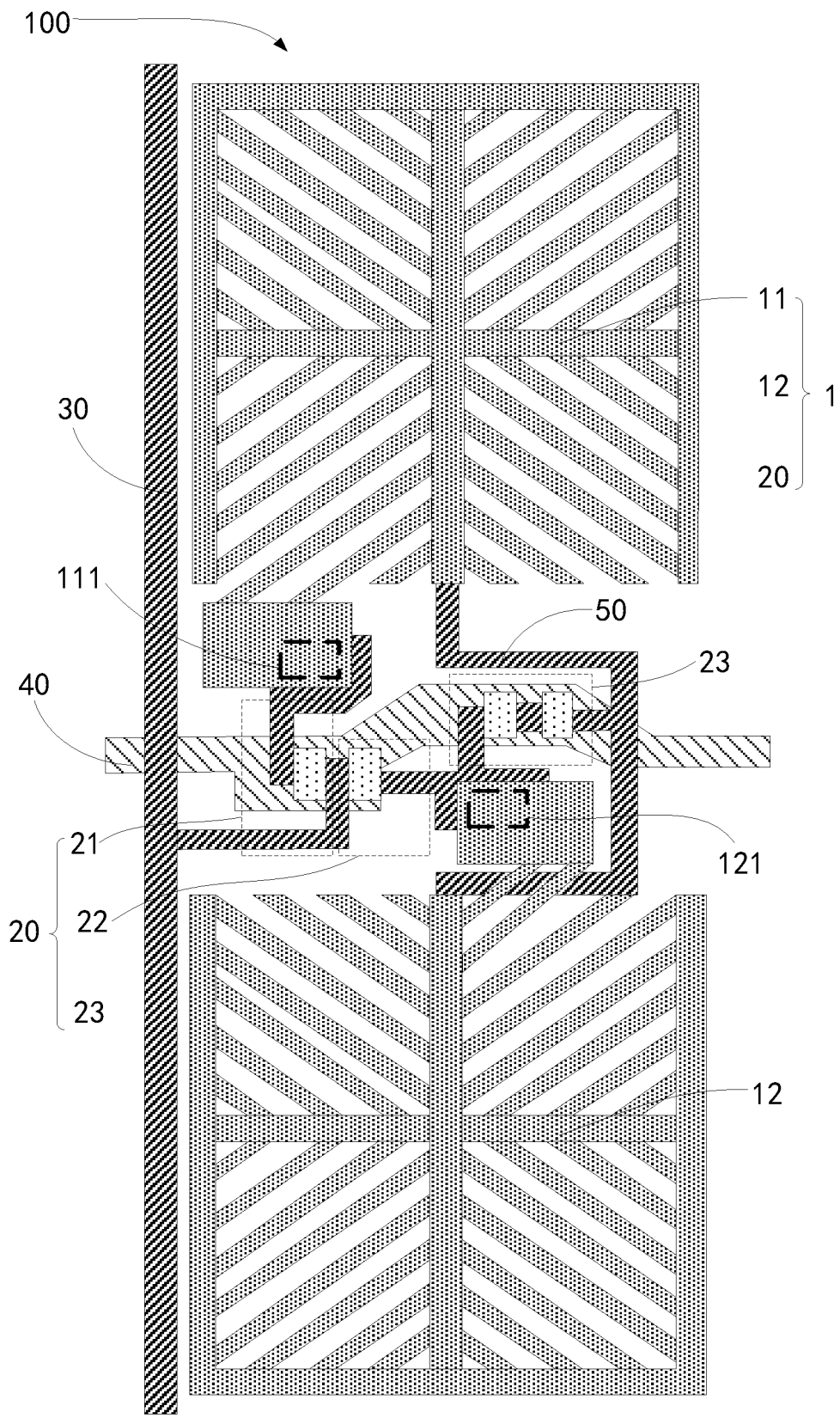
FIG. 1 is a top-view structural schematic diagram of a pixel structure provided by one embodiment of the present application.

The descriptions of embodiments below refer to accompanying drawings in order to illustrate certain embodiments which the present disclosure can implement. The directional terms of which the present disclosure mentions, for example, "top", "bottom", "upper", "lower", "front", "rear", "left", "right", "inside", "outside", "side", etc., only refer to directions of the accompanying figures. Therefore, the used directional terms are for illustrating and understanding the present disclosure, but not for limiting the present disclosure. In the figures, units with similar structures are indicated by the same reference numerals. In the drawings, the thicknesses of layers and regions are exaggerated for clarity. The dimensions and thickness of each component shown in the accompanying figures are arbitrarily shown, present application is not limited thereto.

Figure 2:
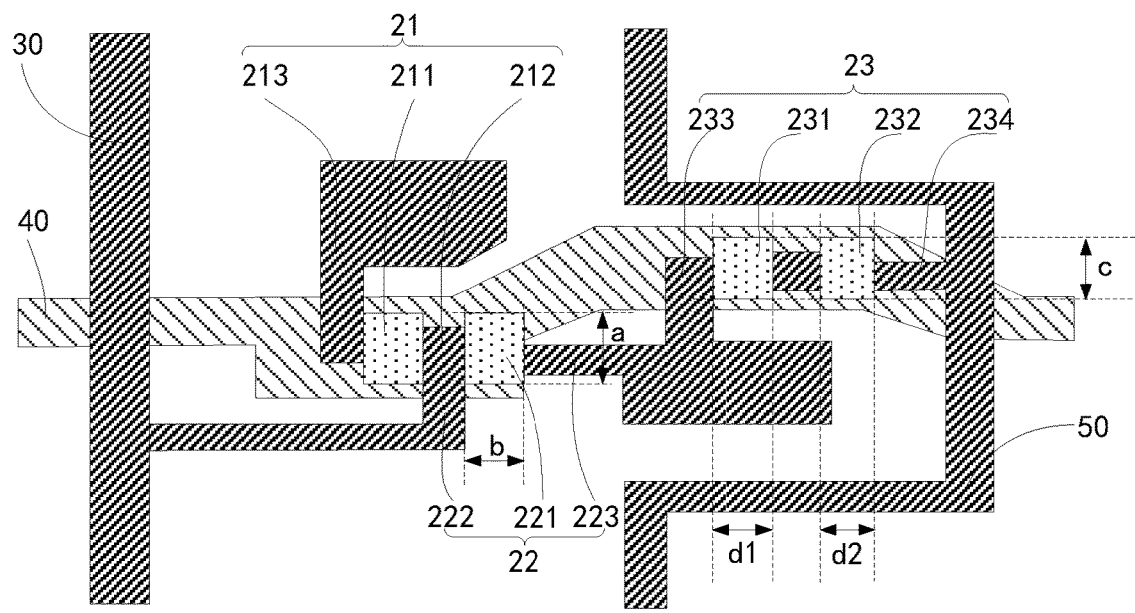
FIG. 2 is a structural schematic diagram of details of a thin film transistor in FIG. 1.
Figure 3:
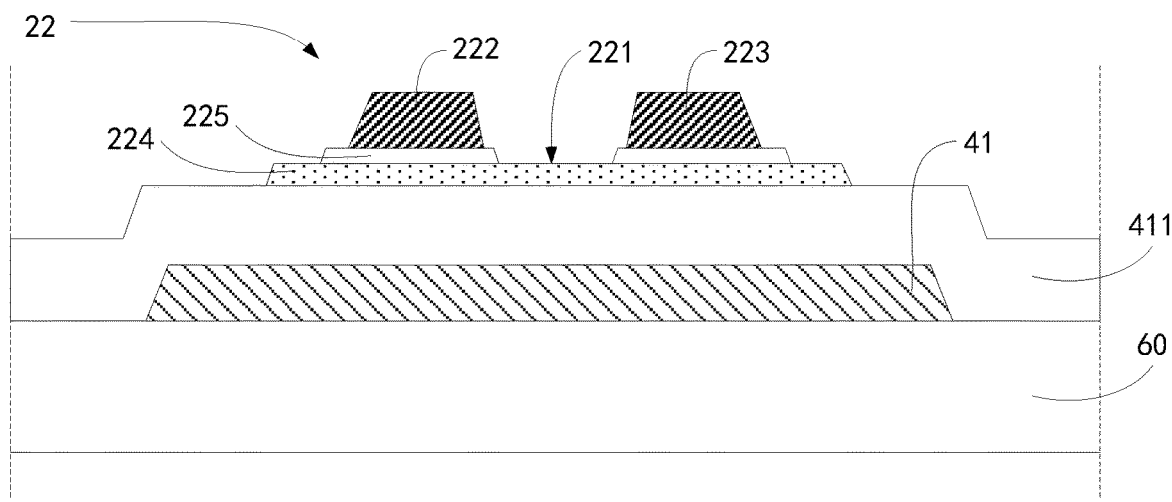
FIG. 3 is a structural schematic diagram of film layers of a driving transistor provided by one embodiment of the present application.

Please combine and refer to FIG. 1 to FIG. 3. FIG. 1 is a top-view structural schematic diagram of a pixel structure provided by one embodiment of the present application. FIG. 2 is a structural schematic diagram of details of a thin film transistor in FIG. 1. FIG. 3 is a structural schematic diagram of film layers of a driving transistor provided by one embodiment of the present application. The pixel structure 100 includes a plurality of sub-pixel units 1. In FIG. 1, one of the sub-pixel units 1 is illustrated. Each of the sub-pixel units 1 includes a first pixel electrode 11 and a second pixel electrode 12, and a plurality of thin film transistors 20. The plurality of thin film transistors 20 include a first driving thin film transistor 21 connected to the first pixel electrode 11; a second driving thin film transistor 22 connected to the second pixel electrode 12; and a voltage division thin film transistor 23 connected to the second driving thin film transistor 22.

Specifically, please continue referring to FIG. 1. The first pixel electrode 11 and the second pixel electrode 12 are disposed opposite to each other. A plurality of thin film transistors 20 are disposed between the first pixel electrode 11 and the second pixel electrode 12. The first pixel electrode 11 and the second pixel electrode 12 both include a plurality of domains. For example, there are two domains, four domains, etc. As illustrated in FIG. 1, each pixel electrode is divided into four domains. Of course, the application is not limited thereto.

The plurality of thin film transistors 20 include a first driving thin film transistor 21, a second driving thin film transistor 22, and a voltage division thin film transistor 23. The first driving thin film transistor 21 is electrically connected to the first driving thin film transistor 11 and is configured to provide a driving voltage to the first pixel electrode 11. The second driving thin film transistor 22 is connected to the second pixel electrode 12, and the second driving thin film transistor 22 is further coupled in series with the voltage division thin film transistor 23. The second driving thin film transistor 22 is configured to provide a driving voltage to the second pixel electrode 12. The voltage division thin film transistor 23 is configured to share the voltage of the second driving thin film transistor 22, which allows the driving voltage of the second pixel electrode 12 provided by the second driving thin film transistor 22 to be different from the driving voltage of the first pixel electrode 11 provided by the first driving thin film transistor 21, thereby achieving the effect of increasing the viewing angle.

A voltage division ratio of the voltage division thin film transistor 23 and the second driving thin film transistor 22 relates to channel lengths and channel widths of the voltage division thin film transistor 23 and the second driving thin film transistor 22. Specifically, a ratio of an aspect ratio of the channel of the voltage division thin film transistor 23 to an aspect ratio of the channel of the second driving thin film transistor 22 is the voltage division ratio of the voltage division thin film transistor 23 and the second driving thin film transistor 22. Wherein, the aspect ratios of the channels refer to ratios of the channel widths to the channel lengths.

When the voltage division ratio of the voltage division thin film transistor 23 and the second driving thin film transistor 22 changes, the driving voltage for driving the second pixel electrode 12 is changed, thereby changing brightness. Therefore, when different regions of the display substrate are affected by processes of ultraviolet exposure, development, and wet etching, etc., or equipment, the aspect ratios of the channels of the voltage division thin film transistor 23 and the second driving thin film transistor 22 are different, which causes the partial voltage to be changed, thereby affecting the display brightness, and cause uneven brightness of the entire display panel.

In the present application, the channel width of the second driving thin film transistor 22 is a, the channel length of the second driving thin film transistor 22 is b, the channel width of the voltage division thin film transistor 23 is c, and the channel length of the voltage division thin film transistor 23 is d. In order to relieve the problem of uneven brightness of the display panel, the channel width a and the channel length b of the second driving thin film transistor 22 and the channel width c and the channel length d of the voltage division thin film transistor can be set to satisfy an equation:

$$\frac{\left(\frac{f}{c}+\frac{n}{d}\right)-\left(\frac{e}{a}+\frac{1}{b}\right)}{\left(\frac{e}{a}+\frac{1}{b}\right)}<10\%,$$

wherein n represents a number of the channels of the voltage division thin film transistor 23, e and f respectively represent a variation parameter of the channel widths of the second driving thin film transistor 22 and the voltage division thin film transistor 23, when the channel widths are changed, the variation parameter is 1; and when the channel widths are not changed, the variation parameter is 0. In this way, by making the channel width a and the channel length b of the second driving thin film transistor 22 and the channel width c and channel length d of the voltage division thin film transistor 23 satisfy the preset equation, the voltage division ratios of the second driving thin film transistor 22 and the voltage division thin film transistor 23 are allowed to be basically same as a preset voltage division ratio when the pixel structure 100 is designed, so the problem of uneven brightness in current display panels is relieved.

It should be noted that whether the channel widths of the second driving thin film transistor 22 and the voltage division thin film transistor 23 are changed refers to variation of actually manufactured channel widths of the second driving thin film transistor 22 and the voltage division thin film transistor 23 compared to the preset channel widths. Wherein, the preset channel widths refer to the channel widths that can be realized in a state of ideal processes, i.e., the defined and designed channel widths when the pixel structure 100 is designed. Furthermore, whether the channel widths of the thin film transistor change depend on the manufacturing processes of the thin film transistor and a channel type of the thin film transistors. For example, for thin film transistors manufactured by using 4-mask processes, i.e., using four masks, the channel widths of the thin film transistors are changed. Regarding the thin film transistors manufactured by non-4-mask processes, whether the channel widths of the thin film transistor change or not depends on the channel type of the thin film transistors.

The thin film transistor manufactured by the 4-mask process is taken as an example firstly to specifically describe the pixel structure of the present application as follow.

In the manufacturing process of the thin film transistors, the 4-mask processes are used to manufacture each of the thin film transistors 20 on the base substrate, which allows to save photomasks, to simplify a process flow, and to save cost. The manufacturing processes of the thin film transistor 20 include sequentially manufacturing a gate electrode, a semiconductor layer, a source electrode, and a drain electrode on the base substrate. Of course, an insulation layer, for example a gate insulation layer, is further disposed between the gate electrode and the semiconductor layer.

Specifically, refer to FIG. 3. The second driving thin film transistor 22 is taken as an example to describe a specific film layer structure of the thin film transistor. The second driving thin film transistor 22 includes a gate electrode 41, a gate insulation layer 411, and a semiconductor layer 224 sequentially manufactured on the base substrate 60, and a source electrode 222 and a drain electrode 223 spaced apart on the semiconductor layer 224. A channel 221 of the second thin film transistor 22 is formed in a region between the source electrode 222 and the drain electrode 223, and an ohmic contact layer 225 is further disposed on a part where the source electrode 222 and the drain electrode 223 contact to the semiconductor layer 224 to ensure good conductive ability. Specifically, the semiconductor layer 224 is located under the source electrode 222 and the drain electrode 223. There is an interval between the source electrode 222 and the drain electrode 223. A part of the interval corresponding to the semiconductor layer 224 is the channel 221 of the second driving thin film transistor 22.

In addition, the source electrode and the drain electrode of the thin film transistor 20 are patterned and formed by one same photomask. The photomask includes a half-tone mask (HTM) or a gray-tone mask, etc.

When one same photomask is used to manufacture the semiconductor layer, the source electrode, and the drain electrode, as different regions of the base substrate are affected by processes of ultraviolet exposure, development, wet etching, etc., or equipment, line widths of the manufactured source electrode and the drain electrode are different. For example, actual line widths of the source electrode and the drain electrode are greater than preset line widths. Wherein, the preset line widths refer to line widths that can be realized in a state of the ideal processes, i.e., line widths designed and defined when the pixel structure 100 is designed.

Furthermore, because the semiconductor layer, the source electrode, and the drain electrode are formed by one same photomask, the interval between the source electrode and the drain electrode are decreased correspondingly, when the line widths of the source electrode and the drain electrode are increased. Therefore, this causes the channel length and the channel width of the thin film transistor 20 to be changed. Specifically, if variation of the line widths of the source electrode and the drain electrode is x, e.g., if the line widths of the source electrode and the drain electrode are increased by x, then the channel width of the thin film transistor 20 is also increased by x. At this time, a variation parameter of the channel width of the thin film transistor 20 is 1, while the channel length of the thin film transistor 20 is decreased. A specific decrement is determined according to a number of channel of the thin film transistor 20. For example, when the number of the channel of the thin film transistor 20 is one, the channel length of the thin film transistor 20 is decreased by x; and when the number of channels of the thin film transistor 20 is two, the channel length of the thin film transistor 20 is decreased by 2x. Wherein, the channel length of the thin film transistor 20 is equal to a distance of the interval between the source electrode and the drain electrode, and the channel width of the thin film transistor 20 is determined according to the width of the semiconductor layer actually filled between the source electrode and the drain electrode.

Meanwhile, the pixel structure 100 further includes a data line 30, a share discharge bar 50 (share bar) disposed in parallel with the data line 30, and a gate line 40 perpendicularly insulated and intersected with the data line 30. Wherein, the data line 30 and the share discharge bar 50 are disposed on a same layer with the source electrode and the drain electrode, the gate line 40 and the gate electrode of the thin film transistor 20 are disposed on a same layer, and the gate line 40 is electrically connected to the gate electrode of the thin film transistor 20.

It should be noted that the "disposed on the same layer" in the present application means that in the manufacturing processes, film layers formed from a same material are patterned to obtain at least two different features, then the at least two different features are disposed on the same layer. For example, in this embodiment, the data line 30 and the source electrode of the thin film transistor 20 are obtained after patterning on one same conductive film layer, and the data line 30 and the source electrode of the thin film transistor 20 are disposed on the same layer.

Furthermore, the source electrode 212 of the first driving thin film transistor 21 and the source electrode 222 of the second driving thin film transistor 22 are designed integrally and are electrically connected to the data line 30. The drain electrode 213 of the first driving thin film transistor 21 is electrically connected to the first pixel electrode 11 through a first via hole 111. The drain electrode 223 of the second driving thin film transistor 22 is electrically connected to the second pixel electrode 12 through a second via hole 121, while the drain electrode 223 of the second driving thin film transistor 22 is also electrically connected to the source electrode 233 of the voltage division thin film transistor 23 at a same time. The drain electrode 234 of the voltage division thin film transistor 23 is electrically connected to the shared discharge bar 50.

The source electrode and drain electrode of the thin film transistor 20 are both disposed to be I-shaped, and correspondingly, the channel of the thin film transistor 20 is also disposed to be I-shaped. Specifically, as illustrated in FIG. 2, the channel 211 of the first driving thin film transistor 21 and the channel 221 of the second driving thin film transistor 22 are disposed to be U-shaped or I-shaped, and the channels of the voltage division thin film transistor 23 include a first sub-channel 231 and a second sub-channel 232. The first sub-channel 231 and the second sub-channel 232 are disposed to be I-shaped. The second sub-channel 231 and the first sub-channel 232 are disposed in parallel and spaced apart from each other. Furthermore, a width of the first sub-channel 231 is equal to a width of the second sub-channel 232, i.e., a channel width c of the voltage division thin film transistor 23. Wherein, the channel of the thin film transistor 20 is disposed to be I-shaped, which means the number of the channel of the thin film transistor 20 is one. In this way, the channels of the voltage division thin film transistor 23 include two I-type sub-channels, which means that the number of the channels of the voltage division thin film transistor 23 is two, and a channel length d of the voltage division thin film transistor 23 is equal to a sum of a channel length d1 of the first sub-channel 231 and a channel length d2 of the second sub-channel 232.

At this time, a channel width a and a channel length b of the second driving thin film transistor 22 and a channel width c and a channel length d of the voltage division thin film transistor 23 satisfy an equation:

$$\frac{\left(\frac{1}{c}+\frac{2}{d}\right)-\left(\frac{1}{a}+\frac{1}{b}\right)}{\left(\frac{1}{a}+\frac{1}{b}\right)} < 10\%.$$

Compared to the preset voltage division ratio, the voltage division ratios of the voltage division thin film transistor 23 and the second driving thin film transistor 22 satisfying the equation are basically unchanged and do not affect the brightness of the pixel region, and thereby do not generate the phenomenon of uneven brightness.

Specifically, the preset voltage division ratio of the voltage division thin film transistor 23 and the second driving thin film transistor 22 being 44% is taken as an example. Optionally, standard preset parameters of the voltage division thin film transistor 23 and the second driving thin film transistor 22, and preset parameters of the present application are illustrated as table 1. Wherein, the preset parameters include the preset channel width and the preset channel length of the voltage division thin film transistor 23, and the preset channel width and the preset channel length of the second driving thin film transistor 22. The preset parameters in the present application refer to actually obtained preset parameters when the channel width c and channel length d of the voltage division thin film transistor 23 and the channel width a and the channel length b of the second driving thin film transistor 22 after being manufactured in processes satisfy a equation:

$$\frac{\left(\frac{1}{c}+\frac{2}{d}\right)-\left(\frac{1}{a}+\frac{1}{b}\right)}{\left(\frac{1}{a}+\frac{1}{b}\right)} < 10\%,$$

and standard preset parameters are the preset parameters that the channel width and the channel length of the manufactured thin film transistor do not satisfy the equation. Numerical units of each preset parameter in Table 1 is micron.

TABLE 1

| | preset channel width of voltage division thin film transistor | preset channel length of voltage division thin film transistor | preset channel width of second driving thin film transistor | preset channel length of second driving thin film transistor |
|---|---|---|---|---|
| Standard preset parameters | 4.4 | 10 | 5 | 5 |
| preset parameters of the present application | 4.7 | 10.68 | 5 | 5 |

As illustrated in Table 2, on the basis of the preset parameters illustrated in Table 1, actual voltage division of the voltage division thin film transistor 23 and the second driving thin film transistor 22 within a range of variation x of the source electrode and the drain electrode ranging from −1 to 1 are possible to be calculated.

TABLE 2

| variation x of the source electrode and the drain electrode | actual voltage divisions ratio corresponding to standard preset parameters | actual voltage divisions corresponding to preset parameters corresponding to the present application |
|---|---|---|
| −1 | 0.4250 | 0.4377 |
| −0.9 | 0.4268 | 0.4382 |
| −0.8 | 0.4286 | 0.4386 |
| −0.7 | 0.4302 | 0.4389 |
| −0.6 | 0.4318 | 0.4392 |
| −0.5 | 0.4333 | 0.4395 |
| −0.4 | 0.4348 | 0.4397 |
| −0.3 | 0.4362 | 0.4399 |
| −0.2 | 0.4375 | 0.4400 |
| −0.1 | 0.4388 | 0.4401 |
| 0 | 0.4400 | 0.4401 |
| 0.1 | 0.4412 | 0.4401 |
| 0.2 | 0.4423 | 0.4400 |
| 0.3 | 0.4434 | 0.4399 |
| 0.4 | 0.4444 | 0.4397 |
| 0.5 | 0.4455 | 0.4395 |
| 0.6 | 0.4464 | 0.4393 |
| 0.7 | 0.4474 | 0.4390 |
| 0.8 | 0.4483 | 0.4386 |
| 0.9 | 0.4492 | 0.4382 |
| 1 | 0.4500 | 0.4378 |

Wherein, the actual voltage division ratio refers to the voltage division ratio of the voltage division thin film transistor 23 and the second driving thin film transistor 22 actually manufactured on the basis of the preset parameters, and the actual voltage division ratio is equal to a ratio of the aspect ratio of the voltage division thin film transistor 23 to the aspect ratio of the second driving thin film transistor 22. For example, taking variation of the source electrode and the drain electrode being x=0.1 micron as an example: the channel width of the voltage division thin film transistor 23 manufactured on the basis of a standard preset parameter is 4.4+0.1=4.5, the channel length of the voltage division thin film transistor 23 is 10−2*0.1=9.8, the channel width of the second driving thin film transistor 22 is 5+0.1=5.1, the channel length of the second driving thin film transistor 22 is 5−0.1=4.9, and an actual voltage division ratio corresponding to the standard preset parameter is (4.5/9.8)/(5.1/4.9)=0.4412; and the channel width of the voltage division thin film transistor 23 manufactured on the basis of the preset parameter of the present application is 4.7+0.1=4.8, the channel length of the voltage division thin film transistor 23 is 10.68−2*0.1=10.48, the channel width of the second driving thin film transistor 22 is 5+0.1=5.1, the channel length of the second driving thin film transistor 22 is 5−0.1=4.9, and an actual voltage division ratio corresponding to the standard preset parameter is (4.5/10.48)/(5.1/4.9)=0.4401.

Figure 4:
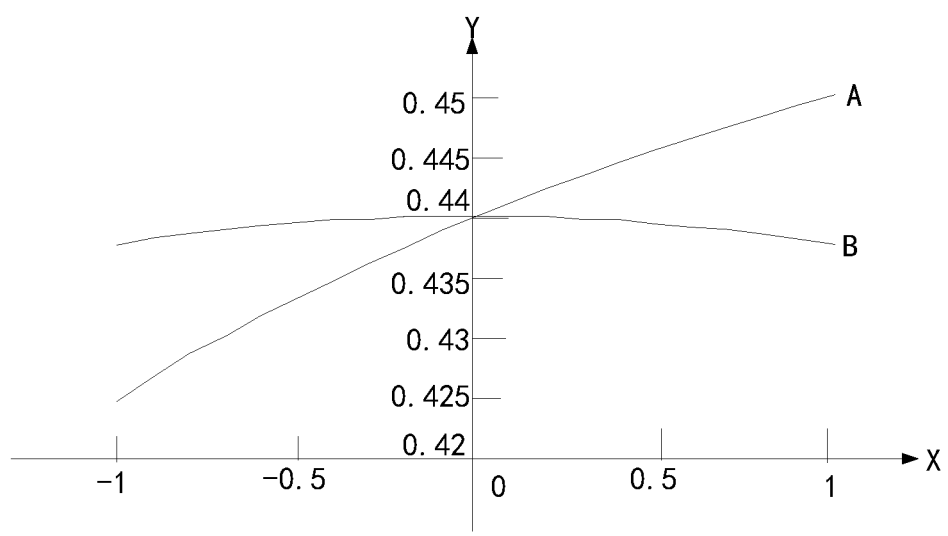
FIG. 4 is a variation tendency diagram of a voltage division ratio according to variation of a source electrode and a drain electrode provided by one embodiment of the present application.

From Table 2, it can be understood that when the variation of the source electrode and the drain electrode gradually changes, the actual voltage division ratio corresponding to the standard preset parameter is greater compared to variation tendency of the preset voltage division ratio. However, the actual voltage division ratio corresponding to the preset parameter of the present application has a smaller variation compared to the preset voltage division ratio. Specifically, please refer to FIG. 4. FIG. 4 is a variation tendency diagram of a voltage division ratio according to variation of a source electrode and a drain electrode provided by one embodiment of the present application. In FIG. 4, an abscissa X represents the variation x of the source electrode and the drain electrode, an ordinate Y represents values of the actual voltage division ratio, a curve A represents the variation tendency of the actual voltage division ratio corresponding to the standard preset parameter according to the variation of the source electrode and the drain electrode, and a curve B represents the variation tendency of the actual voltage division ratio corresponding to the preset parameter of the present application according to the variation of the source electrode and the drain electrode. Compared the curve A to the curve B, it can be clearly and intuitively understood that the actual voltage division ratio corresponding to the preset parameter of the present application has a smaller variation compared to the set preset voltage division ratio, while the actual voltage division ratio corresponding to the standard preset parameter has a greater tendency compared to the set preset voltage division ratio.

Therefore, the channel widths and the channel lengths of the voltage division thin film transistor 23 and the second driving thin film transistor 22 manufactured on the basis of the preset parameters of the present application only need to satisfy the equation of this embodiment, the actual voltage division ratio compared to the preset voltage division ratio basically remaining unchanged can be obtained, so uneven brightness does not appear. Of course, regarding the preset parameter of the present application, this embodiment is only an example, and the preset parameter of the present application also satisfy the equation:

$$\frac{\left(\frac{1}{M}+\frac{n}{N}\right)-\left(\frac{1}{O}+\frac{1}{P}\right)}{\left(\frac{1}{O}+\frac{1}{P}\right)}<10\%.$$

Wherein, M represents the preset channel width of the voltage division thin film transistor 23, N represents the preset channel length of the voltage division thin film transistor 23, O represents the preset channel width of the second driving thin film transistor 22, P represents the preset channel length of the second driving thin film transistor 22, and n represents a number of the channels of the voltage division thin film transistor 23.

Figure 5:
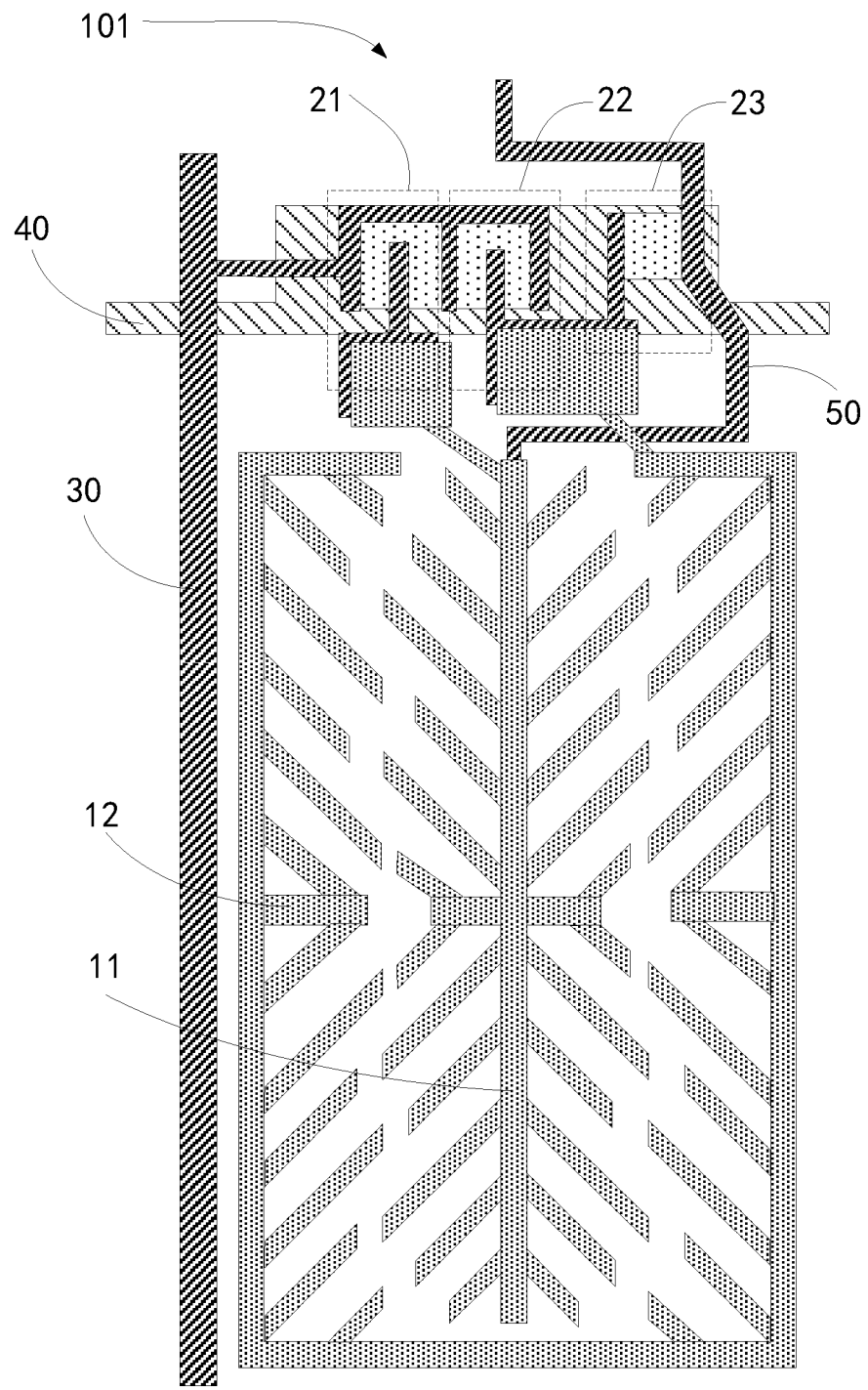
FIG. 5 is another top-view structural schematic diagram of the pixel structure provided by one embodiment of the present application.

In one embodiment, please refer to FIG. 5. FIG. 5 is another top-view structural schematic diagram of the pixel structure provided by one embodiment of the present application. The difference from the aforesaid embodiments is that the first pixel electrode 11 in the pixel structure 101 is located in a region enclosed by the second pixel electrode 12, and a plurality of thin film transistors 20 are located on a same side of the first pixel electrode 11 and the second pixel electrode 12.

Specifically, the source electrode of the first driving thin film transistor 21 and the source electrode of the second driving thin film transistor 22 are disposed to be U-shaped, the drain electrode of the first driving thin film transistor 21 and the drain electrode of the second driving thin film transistor 22 are respectively located in openings of the corresponding U-shaped source electrodes, and the channel of the first driving thin film transistor 21 and the channel of the second driving thin film transistor 22 are also disposed to be U-shaped.

Optionally, the source electrode of the voltage division thin film transistor 23 and the drain electrode of the voltage division thin film transistor 23 are both disposed to be I-shaped, and the channel of the voltage division thin film transistor 23 is disposed to be I-shaped. When the channels of the thin film transistors are disposed to be I-shaped or U-shaped, it represents that the number of the channel of the thin film transistor is one. Therefore, optionally, in this embodiment, the channel of the voltage division thin film transistor 23 can also be disposed to be U-shaped.

At this time, a channel width a and a channel length b of the second driving thin film transistor 22 and a channel width c and a channel length d of the voltage division thin film transistor 23 satisfy an equation:

$$\frac{\left(\frac{1}{c}+\frac{1}{d}\right)-\left(\frac{1}{a}+\frac{1}{b}\right)}{\left(\frac{1}{a}+\frac{1}{b}\right)}<10\%.$$

Compared to the preset voltage division ratio, the voltage division ratios of the voltage division thin film transistor 23 and the second driving thin film transistor 22 satisfying the equation are basically unchanged and do not affect the brightness of the pixel region, and thereby do not generate the phenomenon of uneven brightness. For other descriptions, please refer to the embodiments mentioned above, and redundant description will not be mentioned herein again.

In one embodiment, the difference from the aforesaid embodiments is that the channel width a and the channel length b of the second driving thin film transistor 22 and the channel width c and the channel length d of the voltage division thin film transistor 23 satisfy an equation:

$$\frac{f}{c}+\frac{n}{d}=\frac{e}{a}+\frac{1}{b}.$$

Wherein, n represents a number of the channels of the voltage division thin film transistor 23, and e and f respectively represent a variation parameter of the channel widths of the second driving thin film transistor 22 and the voltage division thin film transistor 23. Regarding the thin film transistors manufactured by using 4-mask processes, variation parameter of the channel width of the thin film transistor is 1. Compared to the preset voltage division ratio, the voltage division ratios of the voltage division thin film transistor 23 and the second driving thin film transistor 22 satisfying the equation are closer and do not affect the brightness of the pixel region, and thereby do not generate the phenomenon of uneven brightness. For other descriptions please refer to the embodiments mentioned above, and redundant description will not be mentioned herein again.

Then, the thin film transistor manufactured by the non-4-mask processes is taken as an example to specifically describe the pixel structure of the present application as follow.

When the thin film transistor is manufactured by using non-4mask processes, the thin film transistor still includes a source electrode, a drain electrode, and a semiconductor layer, the source electrode and the drain electrode are spaced apart on the semiconductor layer, and a channel of the thin film transistors is formed in a region between the source electrode and the drain electrode. However, the difference from the thin film transistor manufactured by using the 4-mask processes is that the source electrode and the drain electrode, and the semiconductor layer are formed under different photomasks, i.e., the source electrode and the drain electrode are formed under one photomask, and the semiconductor layer is formed under another photomask. In this way, a variation situation of the channel width of the thin film transistor is different from a variation situation of the channel width during the 4-mask processes, but a variation situation of the channel width of the thin film transistor is same as a variation situation of the channel length during the 4-mask processes. At this time, the variation situation of the channel width of the thin film transistor relates to the channel type of the thin film transistor.

Different thin film transistor channel types are listed as follow to briefly describe equations satisfied by the channel length and channel width of the thin film transistor under the non-4-mask processes.

In one embodiment, the channel of the second driving thin film transistor is disposed to be U-shaped, the channel of the voltage division thin film transistor is disposed to be I-shaped, the channel width of the second driving thin film transistor is changed, the channel width of the voltage division thin film transistor is not changed, and the number of the channel of the voltage division thin film transistor is 1. At this time, the channel width a and the channel length b of the second driving thin film transistor and the channel width c and the channel length d of the voltage division thin film transistor satisfy an equation:

$$\frac{\left(\frac{0}{c}+\frac{1}{d}\right)-\left(\frac{1}{a}+\frac{1}{b}\right)}{\left(\frac{1}{a}+\frac{1}{b}\right)}<10\%.$$

Compared to the preset voltage division ratio, the voltage division ratios of the voltage division thin film transistor and the second driving thin film transistor satisfying the equation are basically unchanged and do not affect the brightness of the pixel region, and thereby do not generate the phenomenon of uneven brightness.

In one embodiment, the channel of the second driving thin film transistor is disposed to be U-shaped, the channels of the voltage division thin film transistor comprise a first sub-channel and a second sub-channel disposed in parallel and spaced apart, the first sub-channel and the second sub-channel are disposed to be I-shaped, the channel width of the second driving thin film transistor is changed, the channel width of the voltage division thin film transistor is not changed, and the number of the channels of the voltage division thin film transistor is 2. At this time, the channel width a and the channel length b of the second driving thin film transistor and the channel width c and the channel length d of the voltage division thin film transistor satisfy an equation:

$$\frac{\left(\frac{0}{c}+\frac{2}{d}\right)-\left(\frac{1}{a}+\frac{1}{b}\right)}{\left(\frac{1}{a}+\frac{1}{b}\right)}<10\%.$$

Compared to the preset voltage division ratio, the voltage division ratios of the voltage division thin film transistor and the second driving thin film transistor satisfying the equation are basically unchanged and do not affect the brightness of the pixel region, and thereby do not generate the phenomenon of uneven brightness.

In one embodiment, the channel of the second driving thin film transistor is disposed to be I-shaped, the channels of the voltage division thin film transistor include a first sub-channel and a second sub-channel disposed in parallel and spaced apart, the first sub-channel and the second sub-channel are disposed to be I-shaped, the channel widths of the second driving thin film transistor and the voltage division thin film transistor are not changed, and the number of the channels of the voltage division thin film transistor is 2. At this time, the channel width a and the channel length b of the second driving thin film transistor and the channel width c and the channel length d of the voltage division thin film transistor satisfy an equation:

$$\frac{\left(\frac{0}{c}+\frac{2}{d}\right)-\left(\frac{0}{a}+\frac{1}{b}\right)}{\left(\frac{0}{a}+\frac{1}{b}\right)}<10\%.$$

Compared to the preset voltage division ratio, the voltage division ratios of the voltage division thin film transistor and the second driving thin film transistor satisfying the equation are basically unchanged and do not affect the brightness of the pixel region, and thereby do not generate the phenomenon of uneven brightness.

Figure 6:
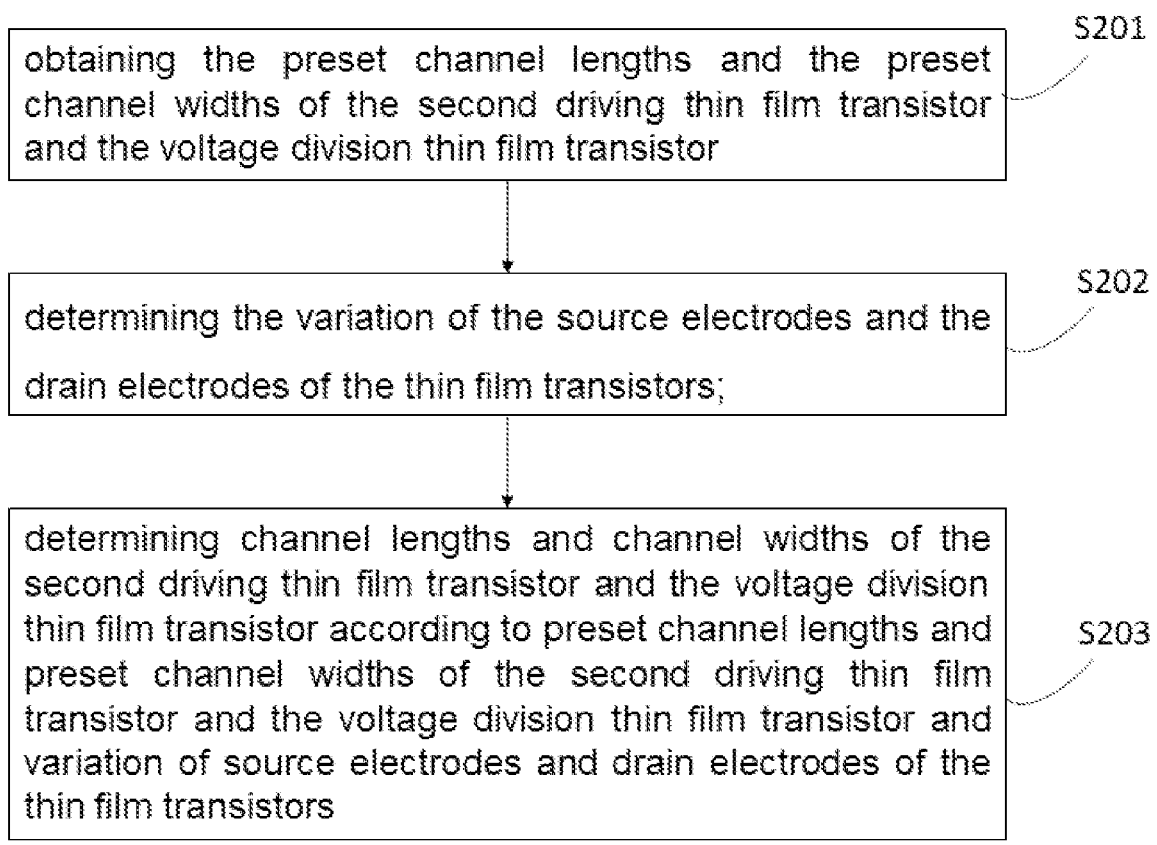
FIG. 6 is a flowchart of a design method of the pixel structure provided by one embodiment of the present application.

In one embodiment, a design method of the pixel structure is provided. Please refer to FIG. 1 to FIG. 6. FIG. 6 is a flowchart of a design method of the pixel structure provided by one embodiment of the present application. The pixel structure 100 includes a plurality of sub-pixel units 1. Each of the sub-pixel units 1 includes a first pixel electrode 11 and a second pixel electrode 12. A plurality of thin film transistors 20 are disposed between the first pixel electrode 11 and the second pixel electrode 12. The plurality of thin film transistors 20 include a first driving thin film transistor 21 connected to the first pixel electrode 11, a second driving thin film transistor 22 connected to the second pixel electrode 12; and a voltage division thin film transistor 23 connected to the second driving thin film transistor 22.

The design method of the pixel structure is used to design the pixel structure in one of the aforesaid embodiments, the method includes:

S201: obtaining the preset channel lengths and the preset channel widths of the second driving thin film transistor 22 and the voltage division thin film transistor 23;

S202: determining the variation of the source electrodes and the drain electrodes of the thin film transistors;

S203: determining channel lengths and channel widths of the second driving thin film transistor 22 and the voltage division thin film transistor 23 according to preset channel lengths and preset channel widths of the second driving thin film transistor 22 and the voltage division thin film transistor 23 and variation of source electrodes and drain electrodes of the thin film transistors, wherein the channel lengths and the channel widths of the second driving thin film transistor 22 and the voltage division thin film transistor 23 satisfy an equation:

$$\frac{\left(\frac{f}{c}+\frac{n}{d}\right)-\left(\frac{e}{a}+\frac{1}{b}\right)}{\left(\frac{e}{a}+\frac{1}{b}\right)}<10\%,$$

and wherein a and b respectively represent the channel width and the channel length of the second driving thin film transistor 22, c and d respectively represent the channel width and the channel length of the voltage division thin film transistor 23, n represents a number of channels of the voltage division thin film transistor 23, e and f respectively represent a variation parameter of the channel widths of the second driving thin film transistor and the voltage division thin film transistor, when the channel widths are changed, the variation parameter is 1, and when the channel widths are not changed, the variation parameter is 0.

Specifically, when the channel width a and the channel length b of the second driving thin film transistor and the channel width c and the channel length d of the voltage division thin film transistor satisfy the equation:

$$\frac{\left(\frac{f}{c}+\frac{n}{d}\right)-\left(\frac{e}{a}+\frac{1}{b}\right)}{\left(\frac{e}{a}+\frac{1}{b}\right)}<10\%,$$

compared to the preset voltage division ratio, the voltage division ratios of the voltage division thin film transistor and the second driving thin film transistor are basically unchanged and do not affect the brightness of the pixel region, and thereby do not generate the phenomenon of uneven brightness.

However, when the channel width a and the channel length b of the second driving thin film transistor 22 and the channel width c and the channel length d of the voltage division thin film transistor 23 satisfy the equation:

$$\frac{f}{c}+\frac{n}{d}=\frac{e}{a}+\frac{1}{b},$$

compared to the preset voltage division ratio, the voltage division ratios of the voltage division thin film transistor and the second driving thin film transistor are closer.

One embodiment of the present application further provides a display panel, including a first substrate and a second substrate disposed opposite to each other, and a plurality of liquid crystal molecules disposed between the first substrate and the second substrate. Wherein, the first substrate includes the pixel structure in one of the aforesaid embodiments. Optionally, the first substrate is an array substrate, and the second substrate is a color film substrate.

According to embodiments mentioned above:

The present application provides the pixel structure and the design method thereof, and the display panel. The pixel structure includes the plurality of sub-pixel units. Each of the sub-pixel units includes the first pixel electrode and the second pixel electrode. The plurality of thin film transistors are disposed between the first pixel electrode and the second pixel electrode. The plurality of thin film transistors include the first driving thin film transistor connected to the first pixel electrode, the second driving thin film transistor connected to the second pixel electrode, and the voltage division thin film transistor connected to the second driving thin film transistor. The channel width and the channel length of the second driving thin film transistor and the channel width and channel length of the voltage division thin film transistor satisfy the preset equation, so the voltage division ratios of the second driving thin film transistor and the voltage division thin film transistor are allowed to be basically same as a preset voltage division ratio when the pixel structure is designed. Therefore, the second driving thin film transistor and the voltage division thin film transistor are not affected by factors of processes of ultraviolet exposure, development, wet etching, etc., or equipment. The problems that the aspect ratios of the share TFT and the sub TFT in the pixel structure are changed, resulting in division voltages of the share TFT and the sub TFT being changed, and causing uneven brightness of the entire display panel in the current pixel structures are solved.

In the above embodiments, the description of each embodiment has its emphasis, and for some embodiments that may not be detailed, reference may be made to the relevant description of other embodiments.

The embodiments of present disclosure are described in detail above. This article uses specific cases for describing the principles and the embodiments of the present disclosure, and the description of the embodiments mentioned above is only for helping to understand the method and the core idea of the present disclosure. It should be understood by those skilled in the art, that it can perform changes in the technical solution of the embodiments mentioned above, or can perform equivalent replacements in part of technical characteristics, and the changes or replacements do not make the essence of the corresponding technical solution depart from the scope of the technical solution of each embodiment of the present disclosure.

What is claimed is:

1. A pixel structure, comprising a plurality of sub-pixel units, wherein each of the sub-pixel units comprises a first pixel electrode and a second pixel electrode, and a plurality of thin film transistors, and wherein the plurality of thin film transistors comprise:
a first driving thin film transistor connected to the first pixel electrode;
a second driving thin film transistor connected to the second pixel electrode; and a voltage division thin film transistor connected to the second driving thin film transistor;

wherein a channel width and a channel length of the second driving thin film transistor and a channel width and a channel length of the voltage division thin film transistor satisfy an equation:

$$\frac{\left(\frac{f}{c}+\frac{n}{d}\right)-\left(\frac{e}{a}+\frac{1}{b}\right)}{\left(\frac{e}{a}+\frac{1}{b}\right)} < 10\%,$$

wherein a and b respectively represent the channel length and the channel width of the second driving thin film transistor, c and d respectively represent the channel length and the channel width of the voltage division thin film transistor, n represents a number of channels of the voltage division thin film transistor, e and f respectively represent a variation parameter of the channel widths of the second driving thin film transistor and the voltage division thin film transistor, when the channel widths are changed, the variation parameter is 1, and when the channel widths are not changed, the variation parameter is 0.

2. The pixel structure as claimed in claim 1, wherein each of the thin film transistors comprises a source electrode, a drain electrode, and a semiconductor layer, the source electrode and the drain electrode are spaced apart on the semiconductor layer, and a channel of the thin film transistors is formed in a region between the source electrode and the drain electrode, and wherein the source electrode, the drain electrode, and the semiconductor layer are formed by a same photomask, and the channel widths are changed.

3. The pixel structure as claimed in claim 2, wherein a channel of the second driving thin film transistor and the channels of the voltage division thin film transistor are disposed to be U-shaped or I-shaped, and the number of the channels of the voltage division thin film transistor is 1.

4. The pixel structure as claimed in claim 2, wherein a channel of the second driving thin film transistor is disposed to be U-shaped or I-shaped, the channels of the voltage division thin film transistor comprise a first sub-channel and a second sub-channel, the first sub-channel is disposed to be I-shaped, the second sub-channel is disposed to be I-shaped, the second sub-channel and the first sub-channel are disposed in parallel and spaced apart from each other, and the number of the channels of the voltage division thin film transistor is 2.

5. The pixel structure as claimed in claim 1, wherein each of the thin film transistors comprises a source electrode, a drain electrode, and a semiconductor layer, the source electrode and the drain electrode are spaced apart on the semiconductor layer, and a channel of the thin film transistors is formed in a region between the source electrode and the drain electrode, and wherein the source electrode, the drain electrode, and the semiconductor layer are formed by different photomasks.

6. The pixel structure as claimed in claim 5, wherein a channel of the second driving thin film transistor is disposed to be U-shaped, the channels of the voltage division thin film transistor is disposed to be I-shaped, the channel width of the second driving thin film transistor is changed, the channel width of the voltage division thin film transistor is not changed, and the number of the channels of the voltage division thin film transistor is 1.

7. The pixel structure as claimed in claim 5, wherein a channel of the second driving thin film transistor is disposed to be U-shaped, the channels of the voltage division thin film transistor comprise a first sub-channel and a second sub-channel disposed in parallel and spaced apart, the first sub-channel and the second sub-channel are disposed to be I-shaped, the channel width of the second driving thin film transistor is changed, the channel width of the voltage division thin film transistor is not changed, and the number of the channels of the voltage division thin film transistor is 2.

8. The pixel structure as claimed in claim 5, wherein a channel of the second driving thin film transistor is disposed to be I-shaped, the channels of the voltage division thin film transistor comprise a first sub-channel and a second sub-channel disposed in parallel and spaced apart, the first sub-channel and the second sub-channel are disposed to be I-shaped, the channel widths of the second driving thin film transistor and the voltage division thin film transistor are not changed, and the number of the channels of the voltage division thin film transistor is 2.

9. The pixel structure as claimed in claim 1, wherein the channel width and the channel length of the second driving thin film transistor and the channel width and the channel length of the voltage division thin film transistor satisfy an equation:

$$\frac{f}{c}+\frac{n}{d}=\frac{e}{a}+\frac{1}{b}.$$

10. A display panel, comprising: a first substrate and a second substrate disposed opposite to each other, and a plurality of liquid crystal molecules disposed between the first substrate and the second substrate, wherein the first substrate comprises a pixel structure, the pixel structure comprises a plurality of sub-pixel units, wherein each of the sub-pixel units comprises a first pixel electrode and a second pixel electrode, and a plurality of thin film transistors, and wherein the plurality of thin film transistors comprise:

a first driving thin film transistor connected to the first pixel electrode;

a second driving thin film transistor connected to the second pixel electrode; and a voltage division thin film transistor connected to the second driving thin film transistor;

wherein a channel width and a channel length of the second driving thin film transistor and a channel width and a channel length of the voltage division thin film transistor satisfy an equation:

$$\frac{\left(\frac{f}{c}+\frac{n}{d}\right)-\left(\frac{e}{a}+\frac{1}{b}\right)}{\left(\frac{e}{a}+\frac{1}{b}\right)} < 10\%,$$

wherein a and b respectively represent the channel length and the channel width of the second driving thin film transistor, c and d respectively represent the channel length and the channel width of the voltage division thin film transistor, n represents a number of channels of the voltage division thin film transistor, e and f respectively represent a variation parameter of the channel widths of the second driving thin film transistor and the voltage division thin film transistor, when the channel widths are changed, the variation parameter is 1, and when the channel widths are not changed, the variation parameter is 0.

11. The display panel as claimed in claim 10, wherein each of the thin film transistors comprises a source electrode, a drain electrode, and a semiconductor layer,
the source electrode and the drain electrode are spaced apart on the semiconductor layer, and a channel of the thin film transistors is formed in a region between the source electrode and the drain electrode, and wherein the source electrode, the drain electrode, and the semiconductor layer are formed by a same photomask, and the channel widths are changed.

12. The display panel as claimed in claim 11, wherein a channel of the second driving thin film transistor and the channels of the voltage division thin film transistor are disposed to be U-shaped or I-shaped, and the number of the channels of the voltage division thin film transistor is 1.

13. The display panel as claimed in claim 11, wherein a channel of the second driving thin film transistor is disposed to be U-shaped or I-shaped, the channels of the voltage division thin film transistor comprise a first sub-channel and a second sub-channel, the first sub-channel is disposed to be I-shaped, the second sub-channel is disposed to be I-shaped, the second sub-channel and the first sub-channel are disposed in parallel and spaced apart from each other, and the number of the channels of the voltage division thin film transistor is 2.

14. The display panel as claimed in claim 10, wherein each of the thin film transistors comprises a source electrode, a drain electrode, and a semiconductor layer,
the source electrode and the drain electrode are spaced apart on the semiconductor layer, and a channel of the thin film transistors is formed in a region between the source electrode and the drain electrode, and wherein the source electrode, the drain electrode, and the semiconductor layer are formed by different photomasks.

15. The display panel as claimed in claim 14, wherein a channel of the second driving thin film transistor is disposed to be U-shaped, the channels of the voltage division thin film transistor is disposed to be I-shaped, the channel width of the second driving thin film transistor is changed, the channel width of the voltage division thin film transistor is not changed, and the number of the channels of the voltage division thin film transistor is 1.

16. The display panel as claimed in claim 14, wherein a channel of the second driving thin film transistor is disposed to be U-shaped, the channels of the voltage division thin film transistor comprise a first sub-channel and a second sub-channel disposed in parallel and spaced apart, the first sub-channel and the second sub-channel are disposed to be I-shaped, the channel width of the second driving thin film transistor is changed, the channel width of the voltage division thin film transistor is not changed, and the number of the channels of the voltage division thin film transistor is 2.

17. The display panel as claimed in claim 10, wherein the channel width and the channel length of the second driving thin film transistor and the channel width and the channel length of the voltage division thin film transistor satisfy an equation:

$$\frac{f}{c}+\frac{n}{d}=\frac{e}{a}+\frac{1}{b}.$$

18. A design method of a pixel structure, wherein the pixel structure comprises a plurality of sub-pixel units, each of the sub-pixel units comprises a first pixel electrode and a second pixel electrode, a plurality of thin film transistors are disposed between the first pixel electrode and the second pixel electrode, the plurality of thin film transistors comprise:
a first driving thin film transistor connected to the first pixel electrode;
a second driving thin film transistor connected to the second pixel electrode; and
a voltage division thin film transistor connected to the second driving thin film transistor;
the design method of the pixel structure comprises:
determining channel lengths and channel widths of the second driving thin film transistor and the voltage division thin film transistor according to preset channel lengths and preset channel widths of the second driving thin film transistor and the voltage division thin film transistor and variation of source electrodes and drain electrodes of the thin film transistors, wherein the channel lengths and the channel widths of the second driving thin film transistor and the voltage division thin film transistor satisfy an equation:

$$\frac{\left(\frac{f}{c}+\frac{n}{d}\right)-\left(\frac{e}{a}+\frac{1}{b}\right)}{\left(\frac{e}{a}+\frac{1}{b}\right)}<10\%,$$

and wherein a and b respectively represent the channel width and the channel length of the second driving thin film transistor, c and d respectively represent the channel width and the channel length of the voltage division thin film transistor, n represents a number of channels of the voltage division thin film transistor, e and f respectively represents a variation parameter of the channel widths of the second driving thin film transistor and the voltage division thin film transistor, when the channel widths are changed, the variation parameter is 1, and when the channel widths are not changed, the variation parameter is 0.

19. The design method of the pixel structure as claimed in claim 18, wherein determining the channel lengths and the channel widths of the second driving thin film transistor and the voltage division thin film transistor according to the preset channel lengths and the preset channel widths of the second driving thin film transistor and the voltage division thin film transistor and the variation of the source electrodes and the drain electrodes of the thin film transistors comprises:
obtaining the preset channel lengths and the preset channel widths of the second driving thin film transistor and the voltage division thin film transistor; and
determining the variation of the source electrodes and the drain electrodes of the thin film transistors.

20. The design method of the pixel structure as claimed in claim 18, wherein the channel width and the channel length of the second driving thin film transistor and the channel width and the channel length of the voltage division thin film transistor satisfy an equation:

$$\frac{f}{c}+\frac{n}{d}=\frac{e}{a}+\frac{1}{b}.$$

* * * * *